United States Patent
Kim et al.

(10) Patent No.: US 10,175,791 B2
(45) Date of Patent: Jan. 8, 2019

(54) DISPLAY DEVICE WITH INTEGRATED TOUCH SCREEN

(75) Inventors: HoonBae Kim, Gyeonggi-do (KR); SangSoo Hwang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 266 days.

(21) Appl. No.: 13/607,966

(22) Filed: Sep. 10, 2012

(65) Prior Publication Data
US 2013/0241868 A1   Sep. 19, 2013

(30) Foreign Application Priority Data
Mar. 14, 2012 (KR) .......................... 10-2012-0026053

(51) Int. Cl.
  G06F 3/041     (2006.01)
  G09G 3/36      (2006.01)
  G06F 3/044     (2006.01)

(52) U.S. Cl.
  CPC ............ G06F 3/0412 (2013.01); G06F 3/044 (2013.01); G09G 3/3685 (2013.01); G09G 2354/00 (2013.01)

(58) Field of Classification Search
  None
  See application file for complete search history.

(56) References Cited

U.S. PATENT DOCUMENTS

| | | | |
|---|---|---|---|
| 7,859,521 B2 | 12/2010 | Hotelling et al. | |
| 2004/0217945 A1* | 11/2004 | Miyamoto et al. | 345/173 |
| 2010/0053112 A1* | 3/2010 | Chen | 345/174 |
| 2010/0194709 A1* | 8/2010 | Tamaki et al. | 345/174 |
| 2011/0169759 A1* | 7/2011 | Wang et al. | 345/173 |
| 2012/0162089 A1* | 6/2012 | Chang | G06F 3/0412 345/173 |
| 2013/0076648 A1* | 3/2013 | Krah et al. | 345/173 |

FOREIGN PATENT DOCUMENTS

| | | |
|---|---|---|
| CN | 1818842 A | 8/2006 |
| TW | 2010/09662 A | 3/2010 |

* cited by examiner

*Primary Examiner* — Duane N Taylor, Jr.
(74) *Attorney, Agent, or Firm* — Morgan, Lewis & Bockius LLP

(57) ABSTRACT

Disclosed is a display device with an integrated touch screen, including a touch screen comprising a plurality of driving electrodes and sensing electrodes built in a panel; a display driver integrated circuit (IC) (i) converting a first driving pulse into a second driving pulse with a gate high voltage Vgh, wherein the second driving pulse is applied to the driving electrodes when the panel operates in a touch driving mode, (ii) receiving a plurality of sensing signals from the sensing electrodes when the panel operates in a touch driving mode, and (iii) applying a common voltage to the driving electrodes and the sensing electrodes when the panel operates in a display driving mode; and a touch IC generating the first driving pulse, wherein the first driving pulse is applied to the display driver IC, and receiving the sensing signals from the display driver IC to detect a touch.

21 Claims, 4 Drawing Sheets

DISPLAY DEVICE WITH INTEGRATED TOUCH SCREEN

CROSS-REFERENCE TO RELATED APPLICATIONS

This application claims the benefit of the Korean Patent Application No. 10-2012-0026053 filed on Mar. 14, 2012, which is hereby incorporated by reference in its entirety.

BACKGROUND

The present disclosure relates to a display device, and more particularly, to a display device with an integrated touch screen built in a panel.

Touch screens are a type of input device that is included in display devices such as Liquid Crystal Displays (LCDs), Field Emission Displays (FEDs), Plasma Display Panel (PDPs), Electroluminescent Displays (ELDs), and Electrophoretic Display (EPDs), and enables a user to input information by directly touching a screen with a finger, a pen or the like while looking at the screen of the display device.

Particularly, the demand of display devices with integrated in-cell type touch screen, which include a plurality of built-in elements configuring the touch screen for slimming portable terminals, such as smart phones and tablet Personal Computers (PCs), is recently increasing.

Display devices with an integrated touch screen are categorized into an optical type, a resistive type, a capacitive type, etc. according to a sensing type. Recently, the capacitive type is mainly used for increasing the sharpness of a screen and the accuracy of touch.

The technology of a display device with integrated capacitive-type touch screen has been disclosed in U.S. Pat. No. 7,859,521, etc. Particularly, U.S. Pat. No. 7,859,521 discloses the technology of a display device with integrated mutual capacitance type touch screen.

In a related art display device with an integrated touch screen disclosed in U.S. Pat. No. 7,859,521, a plurality of common electrodes for display are segmented into a plurality of touch driving areas and touch sensing areas, thereby allowing a mutual capacitance to be generated between the touch driving area and the touch sensing area. Therefore, the related art display device measures the change of a mutual capacitance that occurs in touch, and thus determines whether there is a touch.

In order for the related art display device with an integrated touch screen to simultaneously perform a display function and a touch function, a plurality of common electrodes are respectively connected to a display driver Integrated Circuit (IC) and a touch IC. Also, the touch IC needs to perform a switching function that applies a common voltage to the common electrodes when the panel is driven in a display mode and applies signals necessary for touch to the common electrodes when the panel is driven in a touch mode. Moreover, the intensity of a touch sensing signal needs to increase for enhancing touch sensitivity, for which the touch IC needs to apply a high voltage to a driving electrode.

Therefore, the related art display device with an integrated touch screen needs to separately include a Flexible Printed Circuit (FPC) for a touch IC and an FPC for a Display Driver IC (DDI) to connect the common electrodes and the display driver IC. Further, a touch IC for switching the common voltage is required to be separately manufactured.

Moreover, a separate circuit block needs to be added for applying a high voltage to a driving electrode, and when the touch IC includes the separate circuit block internally, the size of the touch IC is enlarged.

SUMMARY

Accordingly, the present disclosure is directed to provide a display device with an integrated touch screen that substantially obviates one or more problems due to limitations and disadvantages of the related art.

One aspect of the present disclosure is directed to provide a display device with an integrated touch screen, in which a display driver IC internally has a function of switching a common voltage, and by using a gate high voltage that is generated in the display driver IC, a touch IC is not required to be separately manufactured.

Additional advantages and features of some embodiments of the present invention will be set forth in part in the description which follows and in part will become apparent to those having ordinary skill in the art upon examination of the following or may be learned from practice of the disclosure herein. The objectives and other advantages of the invention may be realized and attained by the structure particularly pointed out in the written description and claims hereof as well as the appended drawings.

In one aspect, to achieve these and other advantages and in accordance with the purpose of some embodiments of the invention, as embodied and broadly described herein, a display device with an integrated touch screen according to the present disclosure may include: a touch screen comprising a plurality of driving electrodes and sensing electrodes built in a panel; a display driver integrated circuit (IC) (i) converting a first driving pulse into a second driving pulse with a gate high voltage Vgh, wherein the second driving pulse is applied to the driving electrodes when the panel operates in a touch driving mode, (ii) receiving a plurality of sensing signals from the sensing electrodes when the panel operates in a touch driving mode, and (iii) applying a common voltage to the driving electrodes and the sensing electrodes when the panel operates in a display driving mode; and a touch IC generating the first driving pulse, wherein the first driving pulse is applied to the display driver IC, and receiving the sensing signals from the display driver IC to detect a touch.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings included to provide a further understanding of the present disclosure are incorporated in and constitute a part of this application. The drawings illustrate some embodiments of the invention and together with the description serve to explain the principle of the invention. In the drawings.

DETAILED DESCRIPTION

Reference will now be made in detail to the exemplary embodiments of the present disclosure, examples of which are illustrated in the accompanying drawings. Wherever possible, the same reference numbers will be used throughout the drawings to refer to the same or like parts. Detailed description of known arts will be omitted if it is determined that the arts can mislead the present invention.

Hereinafter, embodiments of the present disclosure will be described in detail with reference to the accompanying drawings.

In the below description, for convenience of a description, a display device with an integrated touch screen according to embodiments of the present disclosure will be exemplified as being an LCD, but the present invention is not limited thereto. The present invention may be applied to various display devices, such as FEDs, PDPs, ELDs, EPDs, etc.

Figure 1:
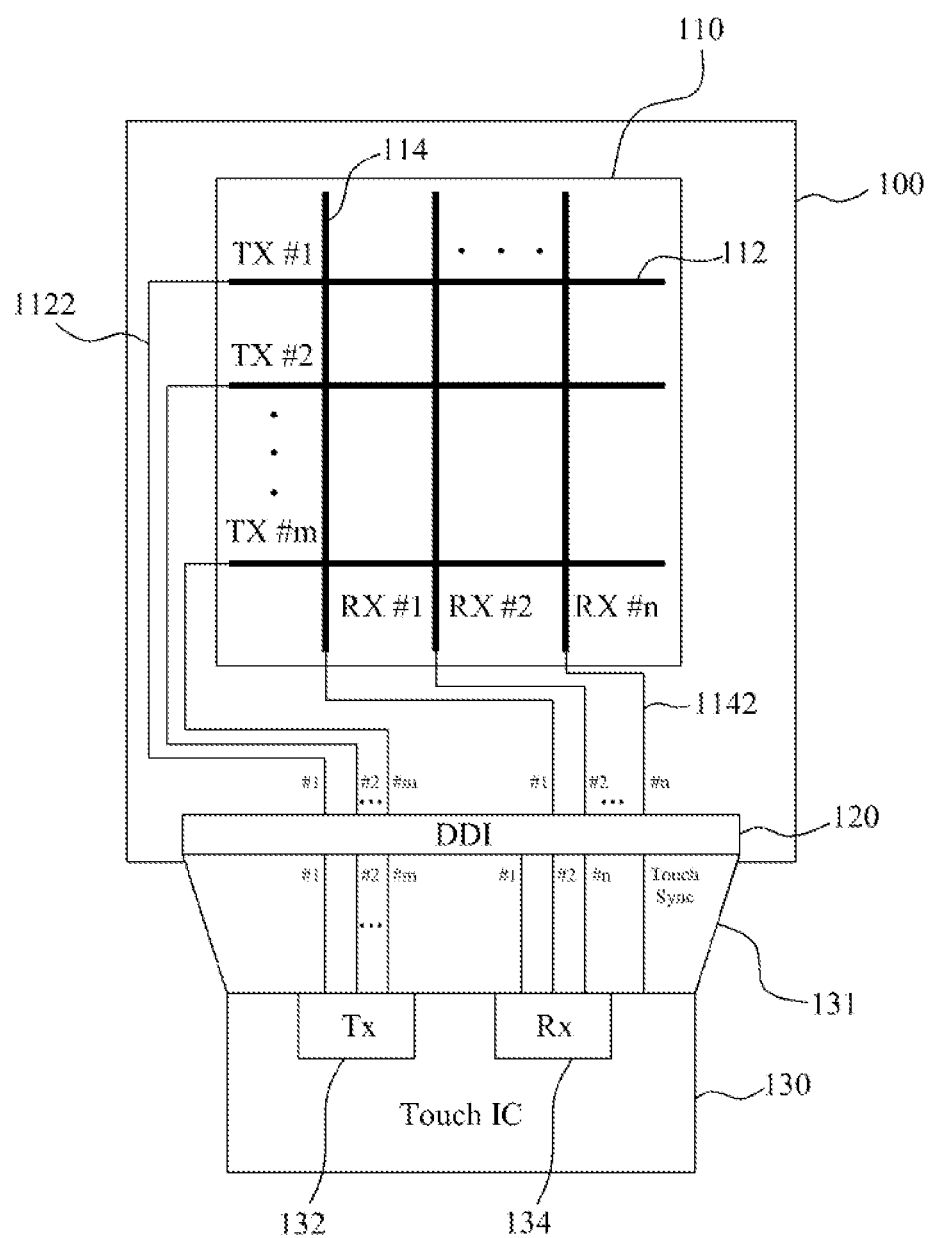
FIG. 1 is a view schematically illustrating a configuration of a display device with an integrated touch screen according to some embodiments of the present disclosure.
Figure 2:
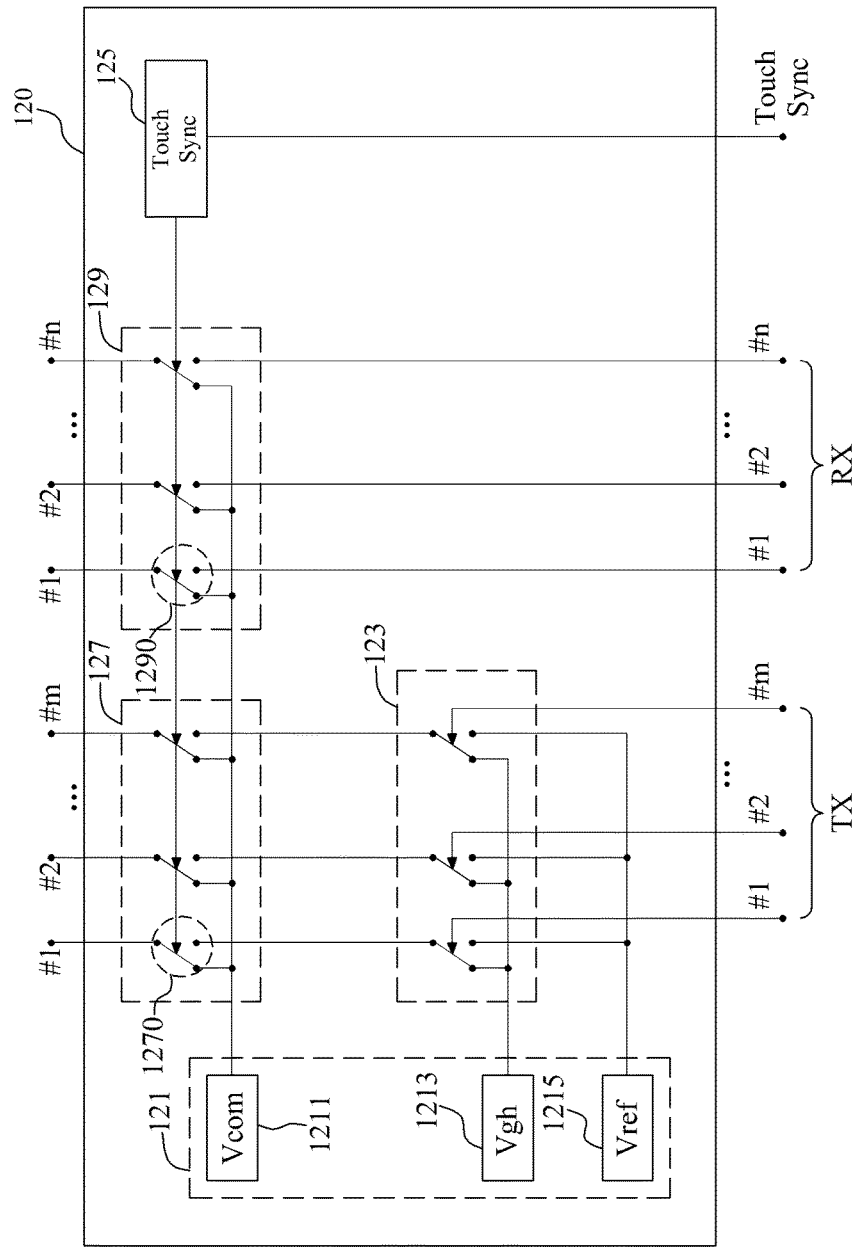
FIG. 2 is a view schematically illustrating a configuration of a display driver IC of the display device according to additional embodiments of the present disclosure.

FIG. 1 is a view schematically illustrating a configuration of a display device with an integrated touch screen according to some embodiments of the present disclosure. FIG. 2 is a view schematically illustrating a configuration of a display driver IC according to additional embodiments of the present disclosure.

As illustrated in FIGS. 1 and 2, the display device with an integrated touch screen may include a touch screen 110, a display driver IC 120, and a touch IC 130.

First, the touch screen 110 may be built in an active area of a panel 100 that displays a screen, and may include a plurality of driving electrodes 112 and a plurality of sensing electrodes 114.

Here, the driving electrodes 112 and the sensing electrodes 114 may perform a function of a common electrode when the display device with an integrated touch screen is driven in a display mode. Further, the driving electrodes 112 and the sensing electrodes 114 may perform a function of a touch driving electrode and a function of a touch sensing electrode when the display device with an integrated touch screen is driven in a touch mode.

In other words, the driving electrodes and sensing electrodes of the display device with an integrated touch screen according to some embodiments of the present invention may perform a touch function as well as a display function.

Hereinafter, a shape of each of the driving electrodes 112 and sensing electrodes 114 will be described in detail with reference to FIG. 3.

Figure 3:
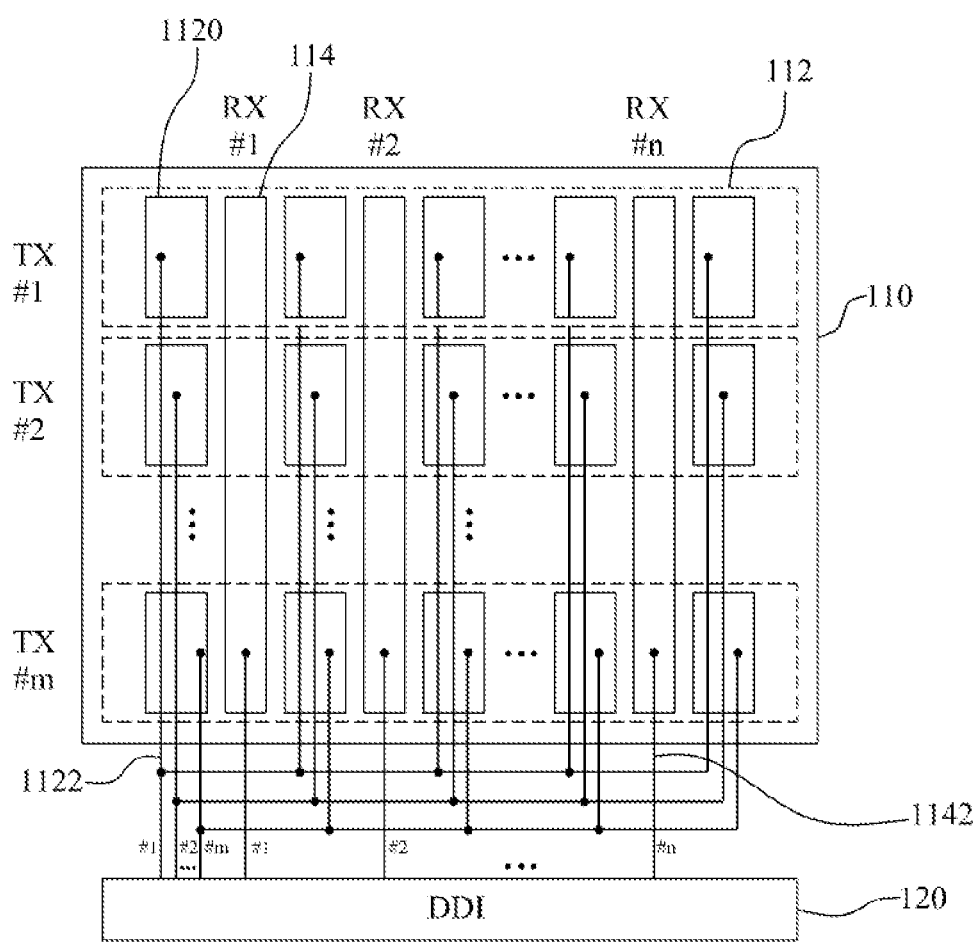
FIG. 3 is a view schematically illustrating shapes of a driving electrode and sensing electrode of a display device with an integrated touch screen according to further embodiments of the present disclosure.

FIG. 3 is a view schematically illustrating details of driving electrodes and sensing electrodes of a display device with an integrated touch screen according to some embodiments of the present disclosure.

The plurality of driving electrodes 112 may be parallelly formed in a width direction that is a gate-line (not shown) direction of the panel 100 shown in FIG. 1. The plurality of sensing electrodes 114 may be disposed between a plurality of sub driving electrodes 1120 and may be parallelly formed in a height direction that is a data-line (not shown) direction of the panel 100.

For example, as illustrated in FIG. 3, the driving electrodes 112 may be a first driving electrode TX#1 to an mth driving electrode TX#m. Each of the driving electrodes 112 may include n+1 number of sub driving electrodes 1120. Also, the sensing electrodes 114 may be a first sensing electrode RX#1 to an nth sensing electrode RX#n. Also, in order for a plurality of sub driving electrodes 1120 to configure one driving electrode as illustrated in FIGS. 1 and 3, a plurality of driving electrode lines 1122 may be electrically connected outside the display drive IC 120, and then connected to the display driver IC 120. Also, the sensing electrodes 114 may be connected to the display driver IC 120 through the sensing electrode lines 1142.

Each of the driving electrodes 112 may be formed as a common electrode having a plurality of block types that is formed to be overlapped with a plurality of unit pixel areas. Each of the sensing electrodes 114 may be formed as a common electrode having one block type that is formed to be overlapped with the unit pixel areas.

In other words, in the embodiments above, the sub driving electrodes 1120 and the sensing electrodes 114 may be formed as one common electrode for a plurality of unit pixel groups. The sub driving electrodes 1120 may be electrically connected to each other.

The plurality of driving electrodes and sensing electrodes may act as a common electrode for driving liquid crystal and thus may be formed of a transparent material, such as an indium tin oxide (ITO) electrode.

In FIG. 3, the plurality of sub driving electrodes 1120 are illustrated as being electrically connected in an area outside the touch screen 110, but the embodiments of the present disclosure are not limited thereto. As another example, the sub driving electrodes 1120 may be electrically connected inside the touch screen 110.

Moreover, in the embodiments above, the common electrode may be formed in units of unit pixel groups, but the embodiments of the present disclosure are not limited thereto. As another example, a common electrode may be formed for each unit pixel, in which the common electrodes that are formed in the respective pixels may be electrically connected by a connection line and thus the sub driving electrodes and the sensing electrodes may be formed.

Referring again to FIGS. 1 and 2, when the panel 100 operates in a touch driving mode, the display driver IC 120 may convert a first driving pulse into a second driving pulse with a gate high voltage Vgh and may apply the second driving pulse to the driving electrode 112, generating a mutual capacitance between the driving electrode 112 and the sensing electrode 114. Also, the display driver IC 120 may receive a sensing signal corresponding to the change amount of a mutual capacitance that is generated from the sensing electrode 114 with a touch sensing reference voltage Vref (e.g. being a Direct Current (DC) voltage) applied thereto in touching.

Herein, the reason that applies the touch sensing reference voltage Vref to the sensing electrode 114 is for sensing the change amount of a mutual capacitance between the driving electrode 112 and the sensing electrode 114 by the touch IC 130 using the touch sensing reference voltage Vref (e.g. being a constant DC voltage).

When the panel 100 operates in a display driving mode, the display driver IC 120 may apply a common voltage Vcom to the driving electrode 112 and the sensing electrode 114 such that the driving electrode 112 and the sensing electrode 114 perform a function of the common electrode for driving the liquid crystal.

For this end, as shown in FIG. 2, the display driver IC 120 may include a voltage generator 121, a driving pulse converter 123, a sync signal generator 125, a first switching part 127, and a second switching part 129. Also, the display driver IC 120 may further include: a gate driver (not shown) that sequentially applies a scan pulse to a plurality of gate lines (not shown); a data driver (not shown) that respectively applies a plurality of image data signals to a plurality of data lines (not shown); and a controller (not shown) that controls the elements. Such elements are general elements included in the display driver IC 120.

The voltage generator 121 may include: a common voltage generator 1211 that generates the common voltage Vcom; a gate high voltage generator 1213 that generates the gate high voltage Vgh; and a touch sensing reference voltage generator 1215 that generates the touch sensing reference voltage Vref.

In other words, the plurality of driving electrodes 112 and sensing electrodes 114 according to some embodiments of the present disclosure may perform a function of the common electrode and a function of the touch electrode together. In particular, (i) the common voltage generator 1211 may generate the common voltage Vcom (e.g. for driving the liquid crystal), (ii) the gate high voltage generator 1213 may generate the gate high voltage Vgh corresponding to the maximum value of the second driving pulse applied to the driving electrodes 112, and (iii) the touch sensing reference voltage generator 1215 may generate the touch sensing reference voltage Vref corresponding to the minimum value of the second driving pulse. Then, the display driver IC outputs the common voltage Vcom in the display driving mode, and the display driver IC selectively outputs the gate high voltage Vgh and the touch sensing reference voltage Vref in the touch driving mode.

In one aspect, the driving pulse converter 123 converts the first driving pulse, generated by the touch IC 130, into the second driving pulse.

For example, in the touch driving mode of the panel 100, when the first driving pulse generated by the touch IC 130 is inputted to the driving pulse converter 123, the driving pulse converter 123 may selectively output the gate high voltage Vgh and the touch sensing reference voltage Vref that are generated by the voltage generator 121, according to the first driving pulse.

As a result, the driving pulse converter 123 may convert the first driving pulse into the second driving pulse with the gate high voltage Vgh as the maximum value and with the touch sensing reference voltage Vref as the minimum value.

In another aspect, the sync signal generator 125 generates a first sync signal indicating the touch driving mode and a second sync signal indicating the display driving mode.

For example, the sync signal generator 125 may generate the first sync signal indicating the touch driving mode at an image output time when the panel 100 operates in the touch driving mode. Moreover, and the sync signal generator 125 may generate the second sync signal indicating the display driving mode at a touch sensing time when the panel 100 operates in the display driving mode.

When the panel 100 operates in the touch driving mode, the sync signal generator 125 may output the first sync signal to the first and second switching parts 127 and 129. When the panel 100 operates in the display driving mode, the sync signal generator 125 may output the second sync signal to the first and second switching parts 127 and 129.

Herein, the sync signal generator 125 may be a controller for the display driver IC 120. The sync signal generator 125 may generate and output the sync signals according to the control by the controller for the display driver IC 125.

Moreover, the sync signal generator 125 may transfer the sync signals to the touch IC 130, thereby controlling the operation of the touch IC 130.

In another aspect, the first switching part 127 selectively connects the driving pulse converter 123 or the common voltage generator 1211 to the plurality of driving electrodes 112 according to an output of the sync signal generator 125. In another aspect, the second switching part 129 selectively connects the touch IC 130 or the common voltage generator 1211 to the plurality of sensing electrodes 114 according to the output of the sync signal generator 125.

For example, when the first sync signal outputted from the sync signal generator 125 is inputted, the first switching part 127 may connect the driving electrodes 112 to the driving pulse converter 123, and the second switching part 129 may connect the sensing electrodes 114 to the touch IC 130.

In other words, when the panel 100 operates in the touch driving mode, in order for the driving electrodes 112 and sensing electrodes 114 to perform the function of the touch electrode, the second driving pulse outputted from the driving pulse converter 123 may be applied to the driving electrodes 112, and the touch IC 130 may receive the sensing signals from the sensing electrodes 114.

When the second sync signal outputted from the sync signal generator 125 is inputted, the first switching part 127 may connect the driving electrodes 112 to the common voltage generator 1211, and the second switching part 129 may also connect the sensing electrodes 114 to the common voltage generator 1211.

Specifically, when the panel 100 operates in the display driving mode, in order for the driving electrodes 112 and sensing electrodes 114 to perform the function of the common electrode, the common voltage outputted from the common voltage generator 1211 may be applied to the driving electrodes 112 and the sensing electrodes 114.

In another aspect, the first switching part 127 may include a plurality of switches 1270 that are respectively connected to the driving electrodes 112, and the second switching part 129 may include a plurality of switches 1290 that are respectively connected to the sensing electrodes 114. The plurality of switches 1270 and 1290 may be connected to the plurality of driving electrodes 112 and the plurality of sensing electrodes 114, respectively.

The number of switches included in the first switching part 127 may be equal to the number of all driving electrodes 112 built in the panel 100, and the number of switches included in the second switching part 129 may be equal to the number of all sensing electrodes 114 built in the panel 100.

Accordingly, in the display device with an integrated touch screen according to some embodiments of the present disclosure, the display driver IC may internally have a function of switching the common voltage. Here, by using the gate high voltage (which is generated in the display driver IC) without adding a separate circuit block for high-voltage driving so as to enhance the intensity of the touch sensing signal, the existing touch IC may be used without manufacturing a separate touch IC, thus saving the manufacturing cost.

According to additional embodiments of the present disclosure, the driving pulse converter 123 and the first switching part 127 have been described above as being included in the display driver IC 120, but the present disclosure is not limited thereto. According to another embodiment of the present disclosure, the driving pulse converter 123 and the first switching part 127 may be included in a gate driver having a Gate In Panel (GIP) type.

Referring to FIGS. 1 and 2, the touch IC 130 may generate the first driving pulse to apply the first driving pulse to the display drive IC 120 and may receive the sensing signals from the display driver IC 120 to detect whether there is a touch.

In one aspect, a driver 132 of the touch IC 130 is connected to the driving pulse converter 123 of the display driver IC 120, and a sensing part 134 is connected to the second switching part 129 of the display driver IC 120.

The touch IC 130 may generate the first driving pulse and apply the first driving pulse to the display driver IC 120, according to the sync signal generated by the sync signal generator 125.

In detail, the touch IC 130 may operate in synchronization with the display driver IC 120. When the panel 100 operates in the touch driving mode, in order for the driving electrodes 112 and sensing electrodes 114 to perform the function of the touch electrode, the driver 132 of the touch IC 130 may generate the first driving pulse to apply the first driving pulse to the driving pulse converter 123, and the sensing part 134 may receive the sensing signals, generated by the respective sensing electrodes 114, from the second switching part 129.

In another aspect, the touch IC 130 may be connected to the display driver IC 120 through a Flexible Printed Circuit Board (FPCB) 131. In another embodiment of the present disclosure, the touch IC 130 may be included in the display driver IC 120.

Hereinafter, a relationship between the first and second driving pulses will be described in more detail with reference to FIG. 4.

Figure 4:
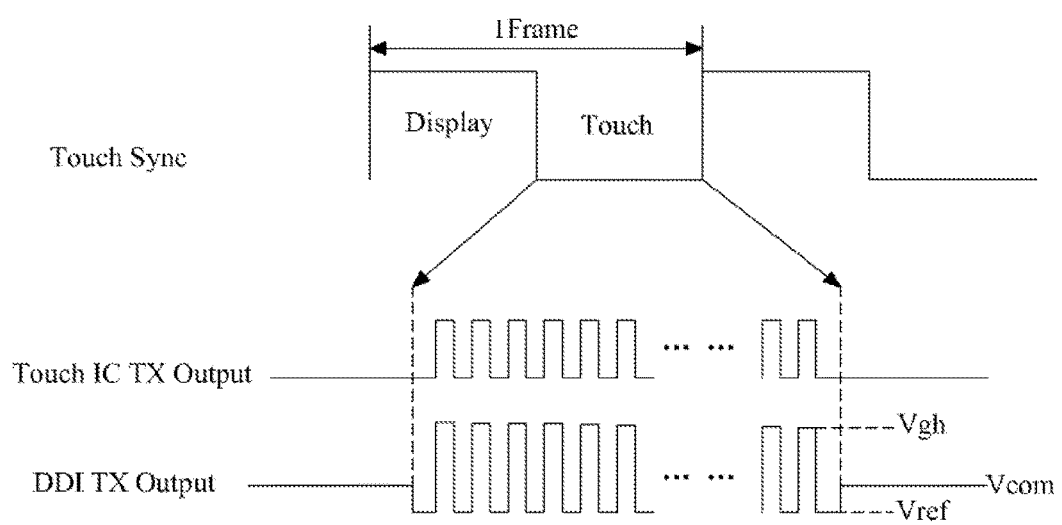
FIG. 4 is a timing chart showing outputs of a touch IC and a display driver IC according to a driving mode of a panel, in a display device with an integrated touch screen according to yet further embodiments of the present disclosure.

FIG. 4 is a timing chart showing outputs of a touch IC and a display driver IC according to a driving mode of a panel, in a display device with an integrated touch screen according to some embodiments of the present disclosure.

In the display device with an integrated touch screen according to some embodiments of the present disclosure, the driving electrodes 112 and sensing electrodes 114 built in the panel 100 may perform the function of the common electrode and the function of the touch electrode together, and thus, the display device may operate in a time-division driving based on the display driving mode and touch driving mode.

Therefore, as shown in FIG. 4, one frame (1 frame) in the time-division driving may be divided into (i) a display period where the panel 100 operates in the display driving mode according to the sync signal and (ii) a touch period where the panel 100 operates in the touch driving mode. A touch driving may be turned off for the display period, and a display driving may be turned off for the touch period, thus minimizing signal interference between the touch driving and the display driving.

In the touch period, the touch IC 130 may output the first driving pulse, and the display driver IC 120 may output the gate high voltage Vgh to the driving electrodes 112 when the first driving pulse has a high level or outputs the touch sensing reference voltage Vref to the driving electrodes 112 when the first driving pulse has a low level. As shown in FIG. 4, the touch sensing reference voltage Vref may be different from the common voltage Vcom.

In the display period, the display drive IC 120 may output the common voltage Vcom to the driving electrodes 112.

According to some embodiments of the present disclosure, the display driver IC may internally has the function of switching the common voltage, and by using the gate high voltage (which is generated in the display driver IC) without adding a separate circuit block for high-voltage driving so as to enhance the intensity of the touch sensing signal, the existing touch IC may be used without manufacturing a separate touch IC, thus saving the manufacturing cost.

It will be apparent to those skilled in the art that various modifications and variations can be made in the present invention without departing from the spirit or scope of the inventions. Thus, it is intended that the present disclosure covers the modifications and variations of this invention provided they come within the scope of the appended claims and their equivalents.

What is claimed is:

1. A display device, comprising: a touch screen comprising a plurality of driving electrodes and a plurality of sensing electrodes in a panel; a touch integrated circuit (IC) configured to: generate a first driving pulse; and receive a plurality of sensing signals to detect a touch on the touch screen; and a display driver integrated circuit (IC) configured to receive the first driving pulse from the touch IC and to provide the sensing signals from the sensing electrodes to the touch IC, the display driver IC comprising: a voltage generator comprising: a common voltage generator configured to generate a common voltage (Vcom); a gate high voltage generator configured to generate a gate high voltage (Vgh); and a touch sensing reference voltage generator configured to generate a touch sensing reference voltage (Vref) different from the common voltage Vcom; a driving pulse converter configured to convert the first driving pulse into a second driving pulse with the gate high voltage Vgh as a maximum value and the touch sensing reference voltage Vref as a minimum value; a sync signal generator configured to generate a first sync signal indicating a touch driving mode and a second sync signal indicating a display driving mode; a first switching circuit configured to selectively provide, to the driving electrodes: the second driving pulse in response to the first sync signal; and the common voltage Vcom in response to the second sync signal; and a second switching circuit configured to selectively connect the sensing electrodes: to the touch IC to provide the sensing signals to the touch IC in response to the first sync signal; and to the common voltage generator to provide the common voltage Vcom to the sensing electrodes in response to the second sync signal.

2. The display device according to claim 1, wherein the display driver IC further comprises a gate driver, a data driver, and a controller.

3. The display device according to claim 1, wherein the first and second sync signals are transferred to the touch IC.

4. The display device according to claim 1, wherein:
each of the driving electrodes comprises sub driving electrodes; and
the sub driving electrodes and the sensing electrodes are formed as one common electrode for a plurality of unit pixel groups.

5. The display device according to claim 1, wherein the touch IC comprises a driver and a sensing part connected to the display driver IC.

6. The display device according to claim 1, wherein the touch IC comprises:
a driver connected to the driving pulse converter of the display driver IC; and
a sensing part connected to the second switching part of the display driver IC.

7. The display device according to claim 1, wherein the touch IC is connected to the display driver IC through a Flexible Printed Circuit Board (FPCB).

8. A method of internally switching a common voltage in the display device of claim 1, comprising:
applying the touch sensing reference voltage Vref to the sensing electrodes during the touch driving mode; and
sensing a change amount of a mutual capacitance between the driving electrodes and the sensing electrodes by the touch IC with the touch sensing reference voltage Vref applied to the sensing electrodes.

9. The method of internally switching a common voltage according to claim 8, further comprising:
generating and outputting by the sync signal generator:
a first sync signal indicating the touch driving mode to the first and second switching parts when the panel operates in the touch driving mode; and
a second sync signal indicating the display driving mode to the first and second switching parts when the panel operates in the display driving mode.

10. The display device of claim 1, wherein the display driver IC is further configured to provide the touch sensing reference voltage Vref to the sensing electrodes during the touch driving mode.

11. The display device of claim 10, wherein the touch sensing reference voltage Vref provided to the touch sensing electrodes during the touch driving mode is a constant direct current (DC) voltage different from the common voltage Vcom.

12. The display device of claim 10, wherein the touch IC is further configured to sense an amount of change in a mutual capacitance between the driving electrodes and the sensing electrodes with the touch sensing reference voltage Vref applied to the sensing electrodes during the touch driving mode.

13. The display device of claim 1, wherein the first switching circuit includes a plurality of first switches, each of the plurality of first switches being connected to a corresponding one of the driving electrodes and configured to selectively connect the corresponding one of the driving electrodes to the driving pulse converter in the touch driving mode or to the common voltage generator in the display driving mode.

14. The display device of claim 10, wherein the second switching circuit includes a plurality of second switches, each of the plurality of second switches being connected to a corresponding one of the sensing electrodes and configured to selectively connect the corresponding one of the sensing electrodes to the touch IC in the touch driving mode or to the common voltage generator in the display driving mode.

15. The display device of claim 1, wherein the driving pulse converter is further configured to:
output the gate high voltage Vgh to the driving electrodes based on the first driving pulse having a high level; and
output the touch sensing reference voltage Vref to the driving electrodes based on the first driving pulse having a low level.

16. The display device of claim 1, wherein the display driver integrated circuit (IC) further comprises:
a gate driver to apply a scan pulse sequentially to a plurality of gate lines of the display device; and
a data driver to apply a plurality of image data signals respectively to a plurality of data lines of the display device.

17. A display device, comprising: a touch screen comprising a plurality of driving electrodes and a plurality of sensing electrodes in a panel; a touch integrated circuit (IC) configured to: generate a first driving pulse; and receive a plurality of sensing signals to detect a touch on the touch screen; and a voltage generator comprising: a common voltage generator configured to generate a common voltage (Vcom); a gate high voltage generator configured to generate a gate high voltage (Vgh); and a touch sensing reference voltage generator configured to generate a touch sensing reference voltage (Vref) different from the common voltage Vcom; a driving pulse converter configured to convert the first driving pulse into a second driving pulse with the gate high voltage Vgh as a maximum value and the touch sensing reference voltage Vref as a minimum value; a sync signal generator configured to generate a first sync signal indicating a touch driving mode and a second sync signal indicating a display driving mode; a first switching circuit configured to selectively provide, to the driving electrodes: the second driving pulse in response to the first sync signal; and the common voltage Vcom in response to the second sync signal; and a second switching circuit configured to selectively connect the sensing electrodes: to the touch IC to provide the sensing signals to the touch IC in response to the first sync signal; and to the common voltage generator to provide the common voltage Vcom to the sensing electrodes in response to the second sync signal.

18. The display device of claim 17, wherein the driving pulse converter and the first switching circuit are included in a gate-in-panel (GIP) type gate driver.

19. The display device of claim 17, wherein the driving pulse converter is further configured to:
output the gate high voltage Vgh to the driving electrodes based on the first driving pulse having a high level; and
output the touch sensing reference voltage Vref to the driving electrodes based on the first driving pulse having a low level.

20. The display device of claim 17, wherein the touch sensing reference voltage Vref is configured to be provided to the sensing electrodes during the touch driving mode.

21. The display device of claim 20, wherein the touch sensing reference voltage Vref provided to the touch sensing electrodes during the touch driving mode is a constant direct current (DC) voltage different from the common voltage Vcom.

* * * * *